United States Patent [19]
Kielwasser

[11] Patent Number: 6,126,536
[45] Date of Patent: Oct. 3, 2000

[54] AUTOMATED SAW FOR SPLITTING CARCASSES

[75] Inventor: Jean C. Kielwasser, deceased, late of Middletown, Conn., by Dominique Kielwasser-Navarette, executrix

[73] Assignee: Jarvis Products Corporation, Middletown, Conn.

[21] Appl. No.: 09/340,244

[22] Filed: Jul. 1, 1999

[51] Int. Cl.[7] .................................................. A22B 5/20
[52] U.S. Cl. ............................................................ 452/160
[58] Field of Search ............................................. 452/160

[56] References Cited

U.S. PATENT DOCUMENTS

| | | |
|---|---|---|
| 3,916,482 | 11/1975 | Kvilhaug . |
| 4,507,822 | 4/1985 | Herubel . |
| 4,562,614 | 1/1986 | Gerding . |
| 4,653,150 | 3/1987 | Leining . |
| 5,112,272 | 5/1992 | Andersen . |
| 5,421,772 | 6/1995 | Durand .................................... 452/160 |
| 5,542,878 | 8/1996 | Sheedy et al. . |
| 5,613,905 | 3/1997 | Van Ochten et al. . |
| 5,655,960 | 8/1997 | Van Horeebeck ....................... 452/160 |

*Primary Examiner*—Willis Little
*Attorney, Agent, or Firm*—DeLio & Peterson, LLC

[57] ABSTRACT

An automated saw for high speed splitting of suspended carcasses, such as hog carcasses, through the backbone as the carcasses continuously move along a carcass rail includes a splitting station and a back roller station located on opposite sides of the carcass rail. The splitting station includes a splitting saw that can be driven in three directions, including horizontally towards a carcass to begin cutting, vertically down to make the cut and horizontally parallel to the carcass rail to match the speed of the moving carcass as the cut is made. A guide roller carried by the splitting station positions the backbone in a known position relative to the saw. The back roller station includes a back roller for positioning the carcass relative to the saw as the cut is made. The back roller is also movable in three directions, including horizontally in to contact the carcass, vertically down, and horizontally parallel to the carcass rail to match the motion of the saw. The back roller and saw are structurally independent, but are accurately driven to maintain the relative position of the saw and the back roller as the cut is made.

24 Claims, 9 Drawing Sheets

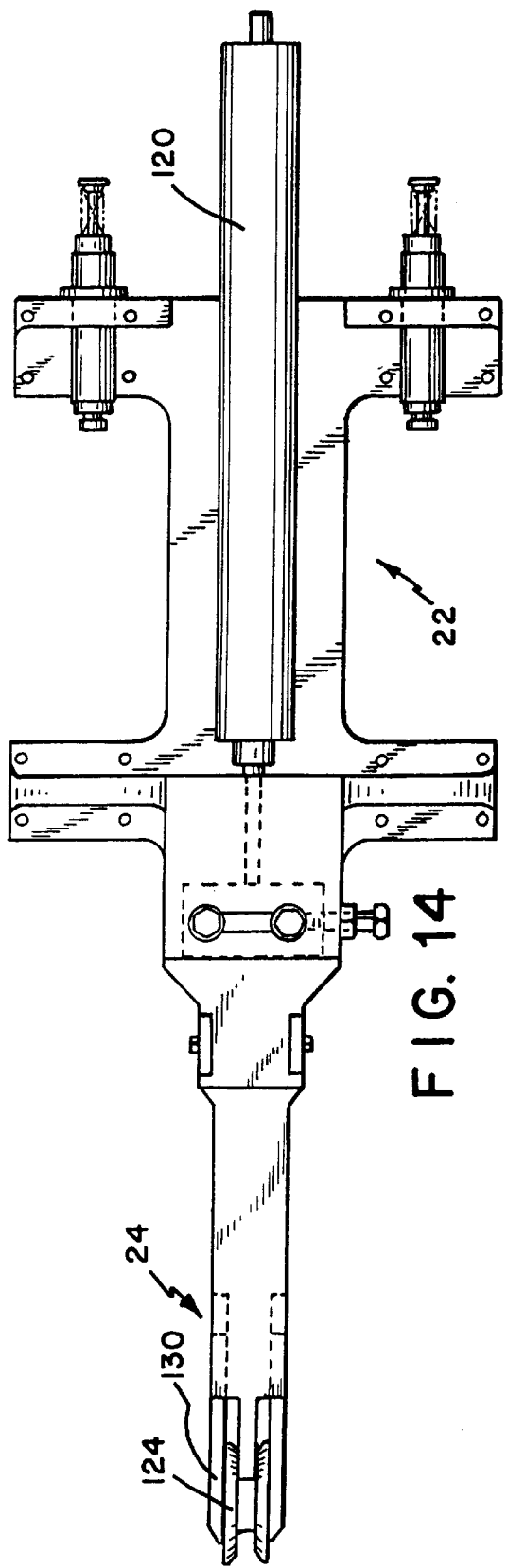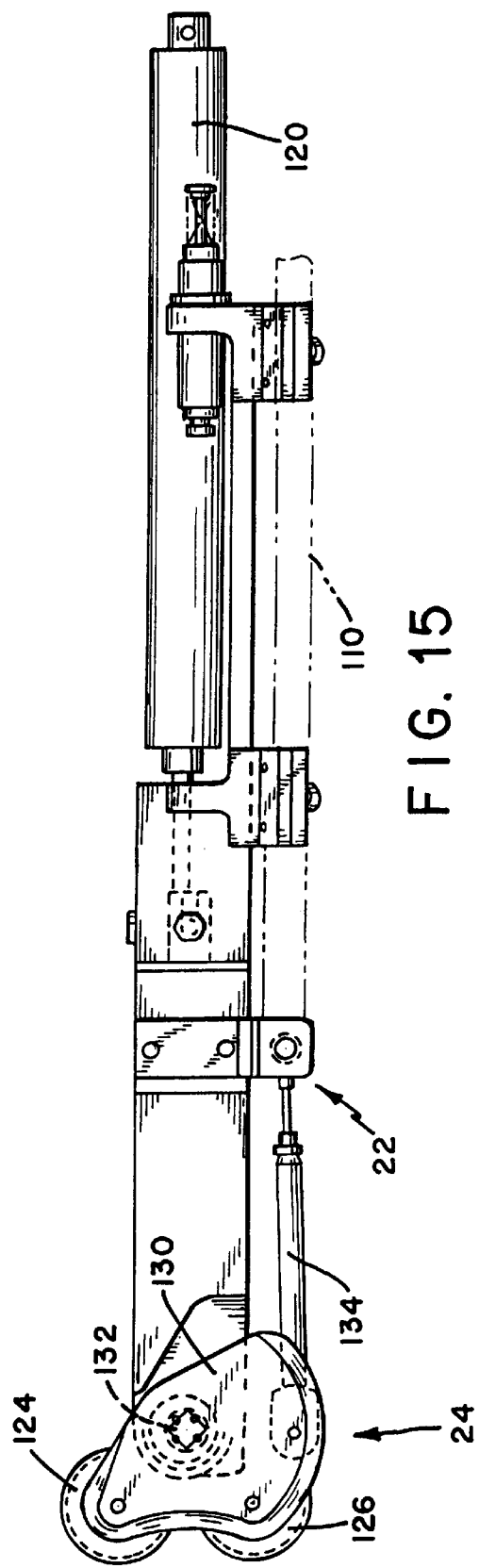

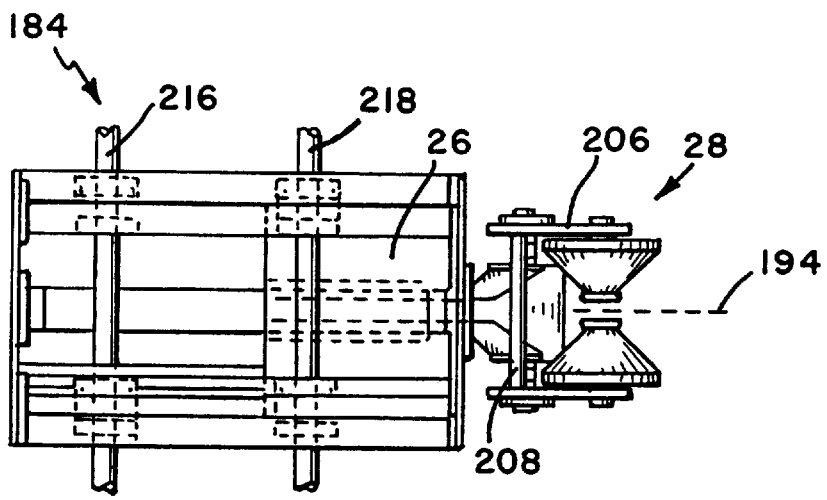
FIG. 20
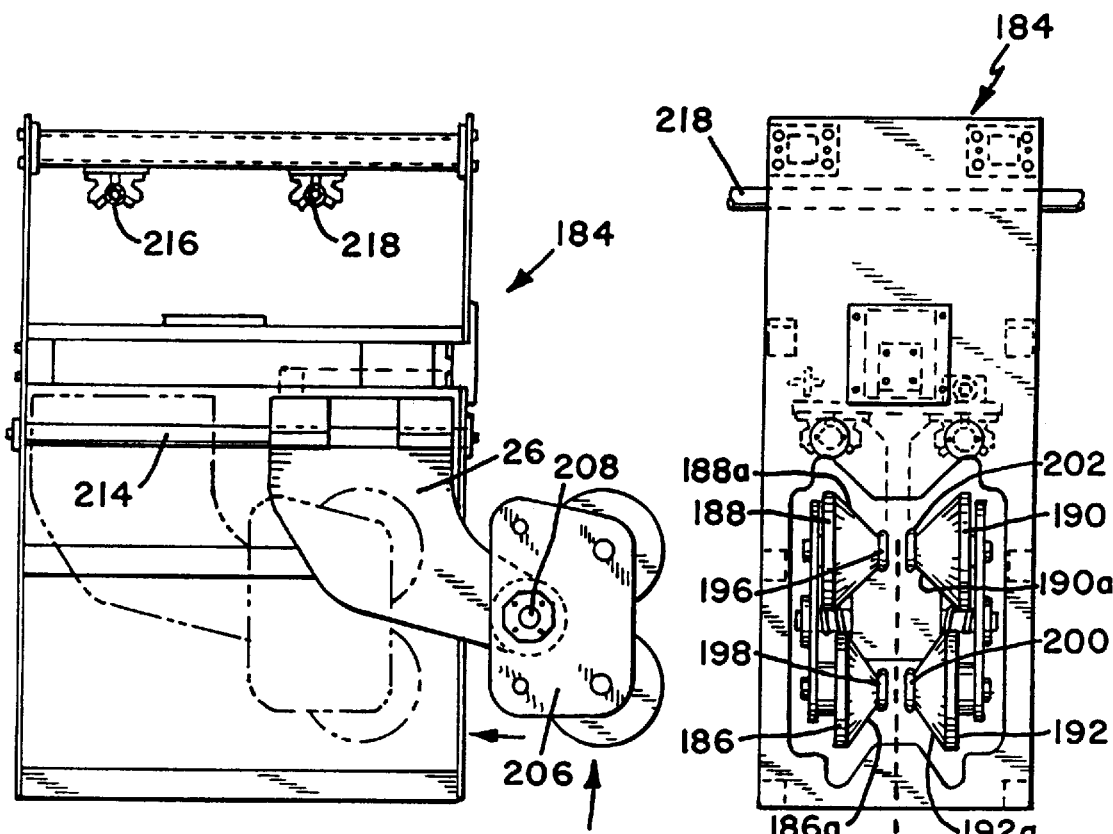
FIG. 21
FIG. 22

AUTOMATED SAW FOR SPLITTING CARCASSES

BACKGROUND OF THE INVENTION

1. Field of the Invention

The present invention relates to saws for splitting eviscerated carcasses while the carcass is suspended and continuously moving along a carcass rail. More specifically, the invention relates to automated saws that split the carcass vertically by simultaneously driving the splitting saw vertically to make the cut and horizontally to follow the moving carcass.

2. Description of Related Art

One step in the processing of carcasses, particularly hog carcasses, is to split the carcass after it has been eviscerated. Automated saws for accomplishing this task are known, but they suffer from various problems, including inaccurate cutting and slow speed. Inaccurate cutting is objectionable as it wastes valuable meat and makes subsequent processing more difficult. Slow speed limits the rate at which carcasses can be processed, or requires that multiple splitting machines be installed to process multiple carcasses simultaneously.

U.S. Pat. No. 4,653,150 issued to Leining on Mar. 31, 1987 shows one type of automated carcass splitting saw. The saw shown therein generally consists of a moving U-shaped frame having two vertical legs. The carcass passes between the vertical legs of the frame with the back of the carcass facing one leg and the eviscerated belly on the carcass facing the opposite leg. The U-shaped frame is driven horizontally along a track at a speed that matches the speed of the moving carcass. The back of the carcass is held between a pair of guide plates which extend out from one leg of the frame to position the carcass and a saw is extended out at the top of the opposite leg of the frame to begin cutting and is then driven vertically down to complete the cut.

One problem with this design is that the carcass is not accurately held relative to the saw by the guide plates due to variations in the size and shape of the carcass. This causes the saw to cut to one side or the other of the exact center line of the backbone. This inaccurate cutting relative to the center line of the backbone is objectionable to the meat processing industry.

A second difficulty relates to the weight of the U-frame due to the need to maintain accurate alignment between the opposite vertical legs of the frame while supporting the carcass from the back and driving the saw vertically along the opposite leg of the frame. The lower horizontal elements of the U-frame, needed to connect and rigidly support the two vertical legs of the frame in the correct relationship, tend to be heavy.

Because the entire U-shaped frame must be returned to the starting point as soon as a cut has been completed, excess weight adversely affects the return speed of the saw. This limits the number of carcasses that can be split per hour to speeds below that which are desirable for operating the carcass rail.

An alternative design for a splitting saw is seen in U.S. Pat. No. 5,655,960 issued to Van Horeebeck on Aug. 12, 1997. This machine uses a saw mounted on an arm. The arm is carried on a single vertical leg and is movable vertically along the leg. The leg is part of a frame that moves horizontally along a track to match the speed of the moving carcass. To make the cut, the arm is extended at the top of the frame between the legs of the carcass suspended from the carcass rail.

A back roller is attached to the end of the arm and swings down into contact with the back of the carcass. A front roller is also located on the arm and contacts the interior of the carcass along the backbone as the saw begins its cut. The two rollers hold the carcass in position relative to the saw.

Unfortunately, in this design the saw begins to cut before the rollers achieve good contact with the carcass. This is because the saw and the front roller are mounted on the same extending arm. Extending the saw into contact with the carcass is the only way to extend the front roller into contact with the carcass. Any initial misalignment as the saw begins to cut results in at least a portion of the carcass being cut improperly off the center line of the backbone. Such initial misalignment is difficult to avoid when the cut is started before the rollers have properly aligned the carcass.

A related problem with this design is speed. The arm must be extended between the legs of the carcass before the back roller can be lowered into position to contact the back of the carcass. This extension and positioning of the arm and rollers between the legs of the carcass is time consuming and slows the cutting operation significantly.

There is yet another problem that arises from the mounting of the guide rollers on the same arm carrying the saw. Some processing operations prefer to split the carcass completely, but others prefer to leave a small connecting portion of neck fat and skin at the head of the carcass intact after the backbone has been split so that the two carcass halves remain attached after the splitting operation. In the design described above, it is not possible for the saw to be retracted relative to the carcass (as needed to make a partial cut) without also partially retracting the roller mounted on the same arm. Thus, if it is desired to make a partial cut, the carcass cannot be held accurately in position relative to the saw.

Another speed problem for the above design arises from the necessity of lifting the back roller and supporting arm sufficiently high to pass between the legs of the carcass. Moving any additional distance beyond the minimum needed to position the saw at the top of its cutting point takes additional time and slows processing. The necessity to pass the back rollers between the legs of the carcass also places various other objectionable limitations on the size, shape and rigidity of the arm which limits accurate positioning of the saw relative to the carcass.

Bearing in mind the problems and deficiencies of the prior art, it is therefore an object of the present invention to provide an automated saw where the carcass can be accurately positioned before the saw begins to cut.

It is another object of the present invention to provide an automated saw in which the saw is separately retractable and extendible relative to the guiding mechanism so that the carcass can be partially cut if desired.

A further object of the invention is to provide an automated saw which can operate at higher speeds than prior art designs to accommodate maximum carcass rail speeds.

Still other objects and advantages of the invention will in part be obvious and will in part be apparent from the specification.

SUMMARY OF THE INVENTION

The above and other objects, which will be apparent to those skilled in art, are achieved in the present invention which is directed in a first aspect to an automated saw for splitting a suspended carcass through the backbone as the carcass is continuously moved along a carcass rail. The automated saw includes a splitting station and a back roller station. The splitting station is structurally independent of the back roller station, but moves in synchronism therewith.

The splitting station includes a fixed splitting station frame, a first tracking carriage movably mounted on the splitting station frame for motion parallel to the carcass rail and a splitting saw carried on the first tracking carriage. The splitting saw is movable by the splitting station vertically and horizontally perpendicular to the carcass rail. The splitting station also includes a first tracking driver for driving the first tracking carriage and the splitting saw at a speed corresponding to the motion of the carcass along the carcass rail.

The back roller station includes a fixed back roller station frame, a second tracking carriage, movably mounted on the back roller station frame for motion parallel to the carcass rail, and a back roller assembly carried on the second tracking carriage for contacting the back of the carcass. The back roller assembly is movable by the back roller station vertically and horizontally perpendicular to the carcass rail. The back roller station further includes a second tracking driver for driving the second tracking carriage and the back roller assembly at a speed corresponding to the motion of the first tracking carriage to maintain relative alignment of the back roller assembly, the splitting saw and the carcass.

The saw may be mounted in different ways to achieve the desired three directions of motion, but the preferred mounting and motion system is to provide a first vertical carriage that is movably mounted on the splitting station frame for vertical motion. The first tracking carriage is then carried by the first vertical carriage. The first tracking carriage moves parallel to the carcass rail to track the moving carcass and a first vertical driver drives the first vertical carriage vertically to make the cut.

The back roller station is provided with a second vertical carriage that is mounted on the back roller station frame for vertical motion. The second tracking carriage is movably mounted on the second vertical carriage for motion parallel to the carcass rail, and a second vertical driver moves the second vertical carriage vertically.

Another feature of the invention is an automatic safety brake connected between the first vertical carriage and the splitting station frame. The safety brake prevents the vertical carriage from dropping rapidly in the event of a power failure.

The first vertical driver is most preferably mounted on the first vertical carriage, whereas the second vertical driver is most preferably mounted on the back roller station frame. In one embodiment of the invention, the first vertical driver includes at least one rack and pinion gear set, and most preferably, four rack and pinion gear sets, the four racks being mounted vertically on vertical posts forming four corners of the splitting station frame.

The first tracking carriage includes a saw carriage movably mounted on the first tracking carriage for motion perpendicular to the carcass rail between a saw extended position and a saw retracted position. The splitting saw is carried on this saw carriage, which also carries a saw motor for driving the splitting saw, and a saw carriage driver for driving the saw carriage between the saw extended position and the saw retracted position.

The automated saw also includes a guide roller carriage that is movably mounted on the first tracking carriage for motion perpendicular to the carcass rail between a guide roller extended position and a guide roller retracted position. The guide roller carriage carries a guide roller that contacts the interior of the carcass to accurately position it so that the saw cuts relative to a known position.

A guide roller carriage driver for driving the guide roller carriage between the guide roller extended position and the guide roller retracted position is also mounted on the first tracking carriage.

The guide roller is designed with two halves so that it accurately guides the backbone. The two halves of the guide roller contact the carcass on opposite sides of the carcass backbone and include angled surfaces on the rollers to continuously direct the backbone into the desired position.

Most preferably, there are first and second guide rollers mounted on a guide roller bracket and the guide roller bracket is pivotally mounted on the guide roller carriage. A guide roller biasing means biases the guide roller bracket such that the first guide roller contacts the carcass before the second guide roller.

The saw carriage driver is computer controlled for retracting and extending the saw carriage independently of the retraction and extension motion of the guide roller carriage.

A back roller carriage is movably mounted on the second tracking carriage in the back roller station for motion perpendicular to the carcass rail between a back roller extended position and a back roller retracted position. The back roller carriage is moved by a back roller carriage driver that drives the back roller carriage between the back roller extended position and the back roller retracted position, the back roller carriage driver having an extension force that is less than the extension force of the guide roller carriage driver. This ensures that the guide roller is always fully extended (giving a known position for the saw to move relative to), while the back roller moves in a spring-like fashion to accommodate different thicknesses of the carcass.

It is desired for the back roller assembly to include at least two back rollers that are approximately conical over a portion thereof to help guide the carcass into position during cutting. The most highly preferred design uses at least four back rollers mounted in a pivoting bracket, the bracket pivoting to allow the back rollers to continuously contact the carcass as the carcass is split. Smaller back rollers may also be used in conjunction with the larger conical back rollers to better position the back of the carcass.

The invention is also directed to the particular method of splitting a suspended carcass through the backbone as the carcass is continuously moved along a defined path. The method includes the steps of:

extending a guide roller into contact with an inner surface of the carcass backbone, the guide roller being extended with a known extension force, and the backbone of the carcass being moved by the guide roller into a known reference position;

extending a back roller into contact with a back surface of the carcass, the back roller being extended with a known extension force less than the known extension force of the guide roller;

extending a saw into cutting engagement with the carcass after the guide roller and back roller contact the carcass;

driving the saw vertically to split the carcass;

driving the saw and the guide roller horizontally to follow the moving carcass; and independently driving the back roller horizontally in synchronism with the saw and the guide roller to follow the moving carcass.

BRIEF DESCRIPTION OF THE DRAWINGS

The features of the invention believed to be novel and the elements characteristic of the invention are set forth with particularity in the appended claims. The figures are for illustration purposes only and are not drawn to scale. the invention itself, however, both as to organization and method of operation, may best be understood by reference to the detailed description which follows taken in conjunction with the accompanying drawings in which:

FIG. 14 is a top plan view of the guide roller carriage, comprising the lower horizontal carriage seen in FIGS. 12–13.

FIG. 15 is a side elevational view of the guide roller carriage, comprising the lower horizontal carriage seen in FIGS. 12–13.

FIG. 20 is a top plan view of the back roller carriage mounted in the back roller station seen in FIGS. 17–19.

FIG. 21 is a side elevational view of the back roller carriage mounted in the back roller station seen in FIGS. 17–19.

FIG. 22 is a front elevational view of the back roller carriage mounted in the back roller station seen in FIGS. 17–19.

DESCRIPTION OF THE PREFERRED EMBODIMENT(S)

In describing the preferred embodiment of the present invention, reference will be made herein to FIGS. 1–22 of the drawings in which like numbers refer to like features of the invention.

Figure 1:
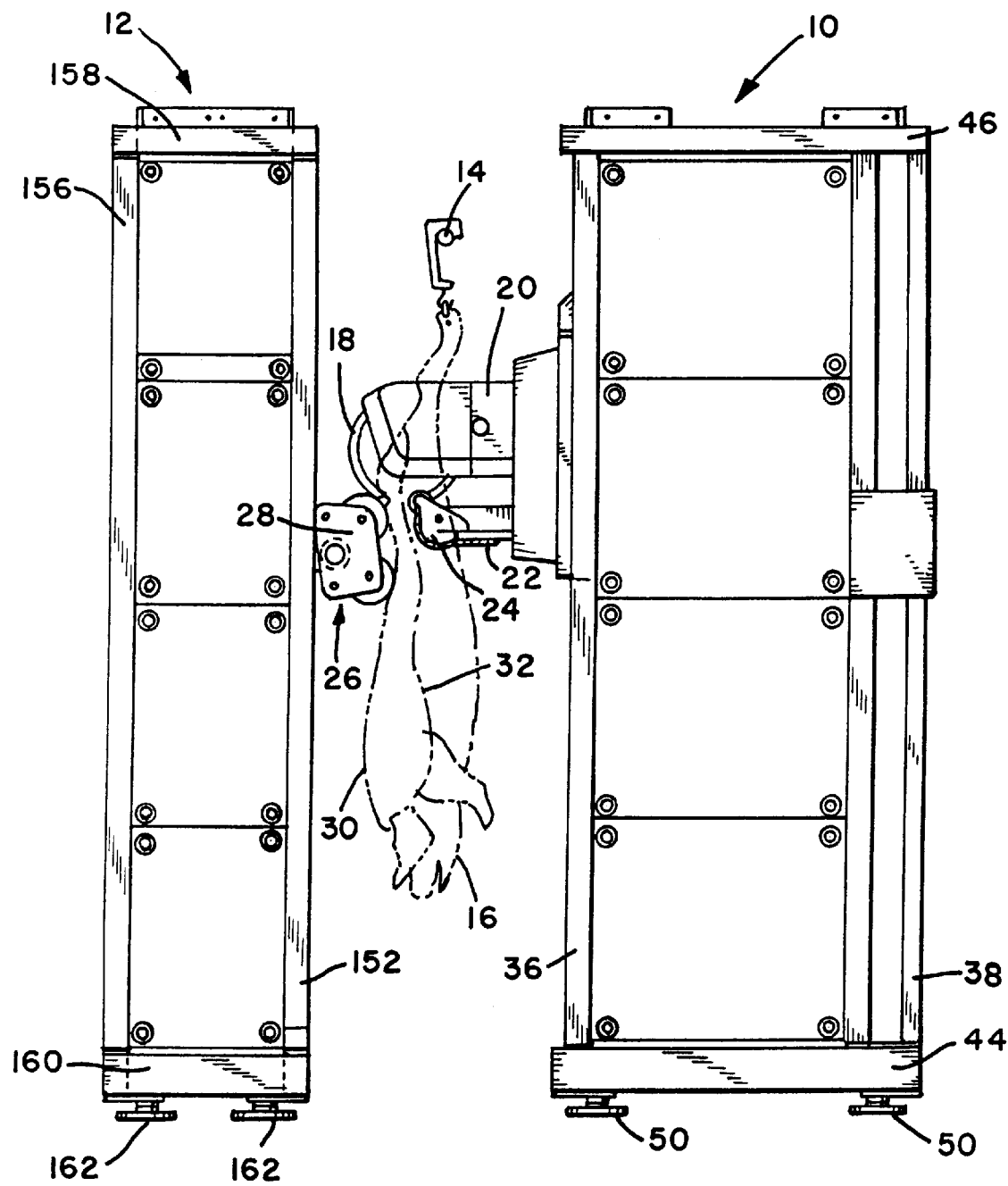
FIG. 1 is a side elevational view of the automated saw of the present invention showing the splitting station, back roller station and a carcass in phantom therebetween about to be split.

Referring to FIG. 1, the invention generally comprises a splitting station 10 and a back roller station 12 located on opposite sides of a carcass rail 14. Carcasses 16 are suspended by their hind feet from trolleys carried on the carcass rail 14, and the carcasses are continuously driven between the splitting station 10 and back roller station 12 where they are split by saw 18.

The carcass is first positioned by extending the guide roller assembly 24 from the splitting station 10 and the back roller assembly 28 from the back roller station 12. The saw 18 is then extended and the cut is made vertically as the saw, guide rollers and back rollers all track the moving carcass. The rollers and saw are then retracted and repositioned to cut the next carcass.

To achieve this operation, the saw 18 is movable in three directions under computer control so that it may track and cut the carcass as the carcass continuously moves along the carcass rail. The extension and retraction motion of the saw 18 is provided by mounting the saw 18 on a saw carriage 20 which moves horizontally perpendicular to the carcass rail.

The splitting station 10 also includes a guide roller carriage 22 carrying the guide roller assembly 24. The guide roller carriage 22 may also be extended and retracted horizontally and its extension and retraction motion is entirely independent of the extension and retraction of the saw carriage 20.

The back roller station 12 includes a back roller carriage, generally indicated with reference number 26, that carries the back roller assembly 28. The back roller assembly is also movable in three directions under computer control. Horizontal extension and retraction motion of the back roller carriage 26 is independent of the extension and retraction of the saw carriage 20 and of the guide roller carriage 22.

As described more fully below, the guide roller assembly 24 cooperates with the back roller assembly 28 and the rollers on each are specially shaped to accurately position the carcass 16 such that the backbone and chine bones of the carcass lie exactly in the same plane as saw 18. The back roller assembly 28 follows the back 30 of carcass 16 while the guide roller assembly 24 follows the inner surfaces of the backbone 32 of the carcass. Because the guide roller carriage and back roller carriage may be extended independently of the saw carriage, they may be extended into position to accurately position the carcass 16 prior to initiating any cutting with the saw 18.

In order to complete the splitting operation, the saw carriage 20 and the guide roller carriage 22 are movable vertically downward. The saw carriage 20 and the guide roller carriage 22 are carried on a common vertical carriage 34 (see FIGS. 8, 9 and 10). The vertical carriage is movable vertically inside the splitting station 10 under computer control. The back roller carriage 26 is mounted in a similar way in a second vertical carriage mounted inside the frame of the back roller station 12 and is also driven vertically under computer control.

The vertical carriage in the splitting station 10 is structurally independent of the vertical carriage in the back roller station 12 and the desired level of synchronism between the vertical motions of these carriages is maintained by the computerized motion control system. The vertical carriages may be driven completely synchronously vertically, or where desired, the saw or the back rollers may be driven differently so that there is some relative vertical motion between the back rollers and the saw.

Because the saw carriage 20 has independent extension and retraction motion, the saw 18 may be retracted at any point during a cutting operation to limit the vertical length and depth of the downward cut. This is particularly desirable in certain operations where the processing requires that a portion of the carcass remain connected near the head of the carcass.

The independence of the back roller station from the splitting station allows great flexibility in operation and rapid speed because the saw and rollers are driven by separate powerful driver motors. The independence of the two mechanisms means that there are no mechanical beams or other structures necessary to link or rigidly connect the two sides of the automated saw mechanism. This decreases the size and weight of the moving parts of the machine, allowing faster speeds to be reached and requiring shorter travel distances, as compared to other saw designs, for the saw to be reset for each subsequent cut.

Figure 2:
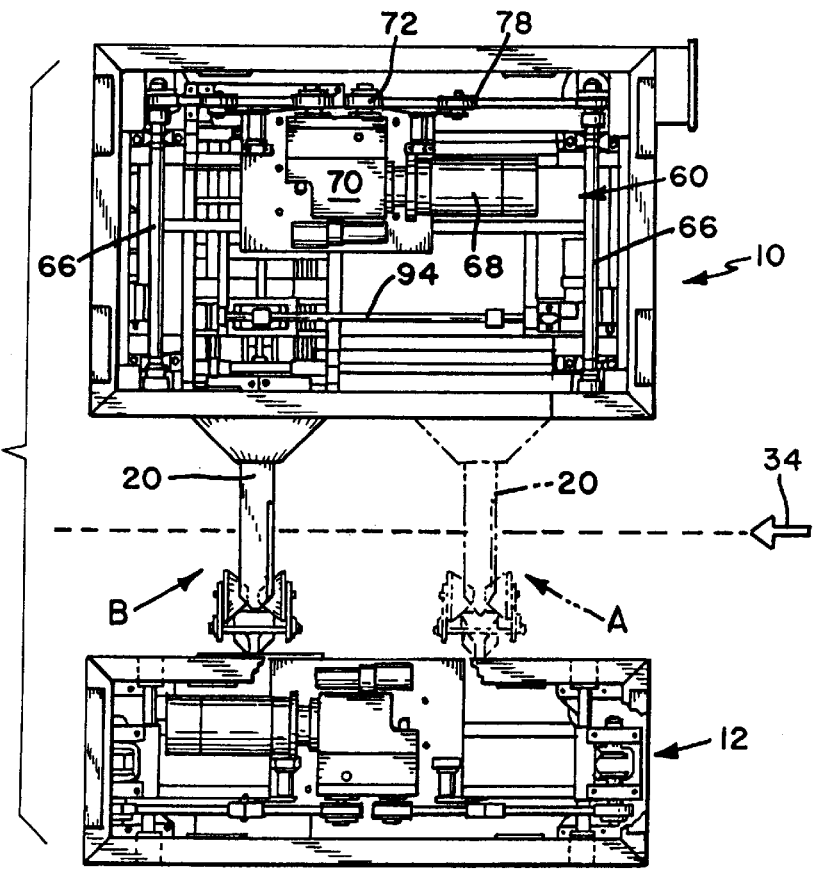
FIG. 2 is a top plan view of the automated saw shown in FIG. 1. The rollers and saw which move horizontally to track the motion of the carcass are shown in solid in a first position and in phantom in a second position.

Because the carcasses 16 are continuously moving along the carcass rail 14, the saw and rollers must be driven horizontally to follow the moving carcass. FIG. 2 provides a top view which illustrates the direction of motion 34 of the carcass. The saw carriage, guide roller carriage and back roller carriage are initially extended at the position A shown in phantom in FIG. 2 and continuously move from left to right until they reach position B in FIG. 2. Position A is shown in FIG. 1 with the saw at the top of its vertical stroke. By the time the carriages have moved horizontally to position B, they have also reached the bottom of their vertical travel and the cut is complete. The carriages are then retracted horizontally, returned horizontally to position A and returned to the top of their vertical travel ready to produce another cut.

Conventional safety features and interlocks are used with the saw to ensure that a carcass is actually in the saw, and to prevent the saw from inadvertently actuating during use, cleaning, maintenance, testing or initial installation. Such safety interlocks and features include sensors on the carcass rail to determine when a carcass is in position, positive manual disconnects for the drive and power systems to allow servicing of the saw, computer motion control testing modes wherein the saw is unpowered, emergency stop switches, limit switches and sensors to determine overloads or other stop conditions and required positive startup actuation after any emergency stop of the saw mechanism.

FIGS. 3–7 show the frame of the splitting station 10. The carriages that move inside that frame have been omitted in these figures for clarity. The splitting station frame comprises 4 vertical corner posts 36, 38, 40 and 42 mounted between a lower rectangular frame 44 and an upper rectangular frame 46. The splitting station frame sits on feet 50 which are securely attached to the floor to prevent the frame from moving. Feet 50 may be adjusted to level the frame and maintain alignment relative to the back roller station 12. The vertical corner posts 36–42 provide support for four vertical tracks, and the vertical carriage (shown in FIGS. 8–10) rides along these tracks and carries the saw and guide roller carriages.

Figure 7:
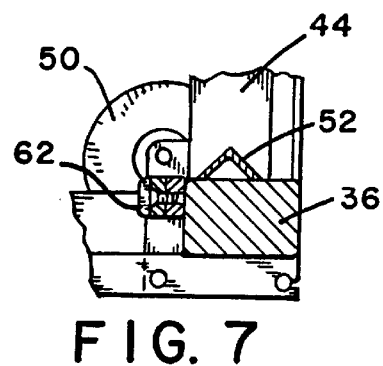
FIG. 7 is a detail horizontal cross sectional view at an enlarged scale showing the lower right hand corner of the splitting station frame cross sectional view in FIG. 5.

Two of the four vertical tracks are in the shape of vertical V-rails 52, seen best in FIG. 7. The V-rail tracks are found on vertical posts 36 and 42. Matching V-rollers 54 (see FIG. 8) on the vertical carriage are guided vertically by the V-rails 52 mounted on vertical posts 36 and 42. The opposing vertical supports 38, 40 include flat track surfaces. Wheels 56 on the vertical carriage 60 (see FIG. 8) ride along these flat track surfaces. The wheels 54, 56 are adjustable to exactly hold the vertical carriage 60 between the V-rail tracks 52 on vertical corner posts 36 and 42 and the flat surface tracks 58 on the opposing surfaces of vertical corner posts 38 and 40.

The wheels 54 and 56 on the vertical carriage 60 cooperate with the vertical tracks and allow the vertical carriage to be moved very accurately in the vertical direction without any horizontal wander. The wheels are free-wheeling, however, and do not act to move the vertical carriage 60. To provide the vertical motion, the vertical carriage 60 is driven vertically with four rack and pinion mechanisms. Each of the four vertical corner post 36–42 is provided with a long rack gear 62.

Each rack gear is mounted on the inner side of the corner post that is adjacent to the inner side of the corner post carrying the vertical track. The four rack gears 62 on the four corner posts are engaged by corresponding pinion gears 64 on the vertical carriage 60 (see FIG. 8, 10), and these gears are driven to propel the vertical carriage up and down within the splitting station frame.

Figure 9:
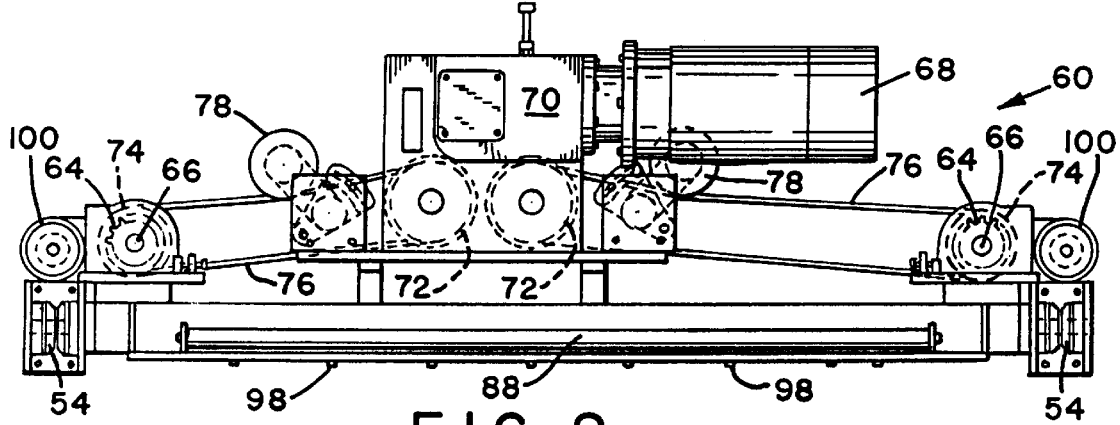
FIG. 9 is a front elevational view of the vertical carriage of FIG. 8.
Figure 10:
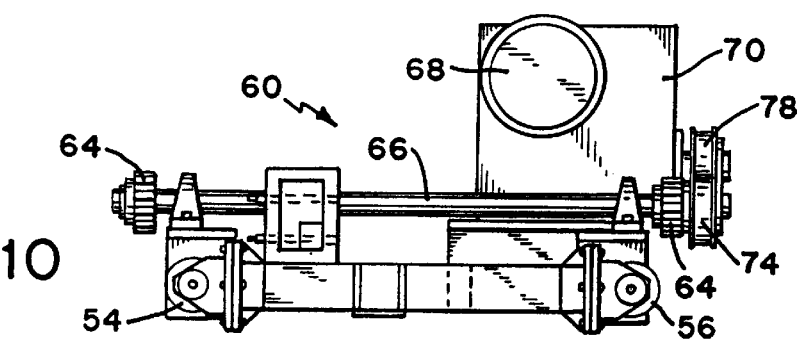
FIG. 10 is a side elevational view of the vertical carriage of FIG. 8.
Figure 3:
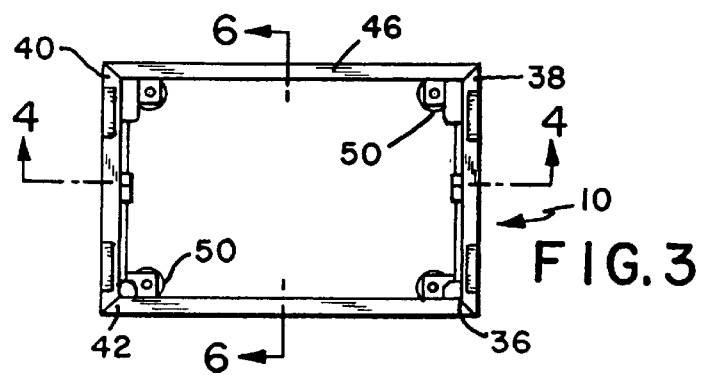
FIG. 3 is a top plan view of the splitting station frame of the automated saw shown in FIG. 1, the vertical carriage, tracking carriage and horizontal carriage being omitted to better show the construction of the frame.
Figure 4:
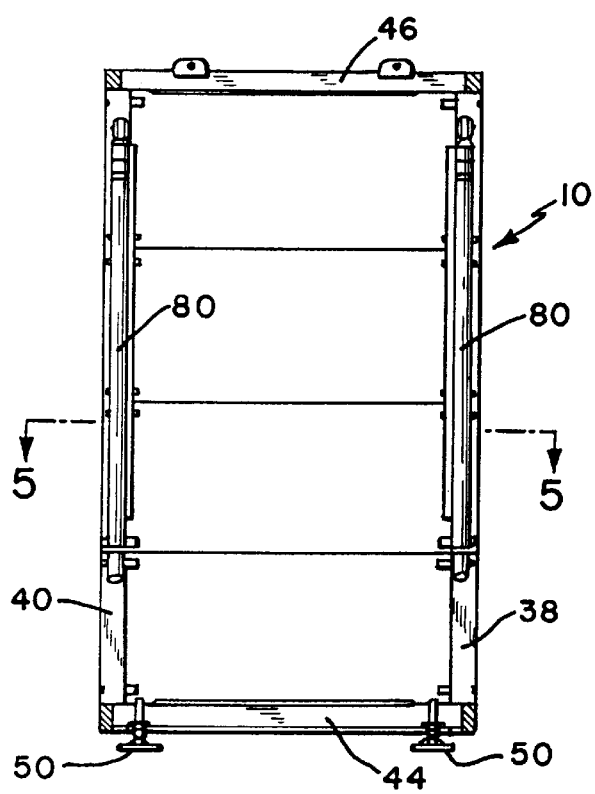
FIG. 4 is a vertical cross sectional view of the splitting station frame taken along the line 4—4 in FIG. 3.
Figure 6:
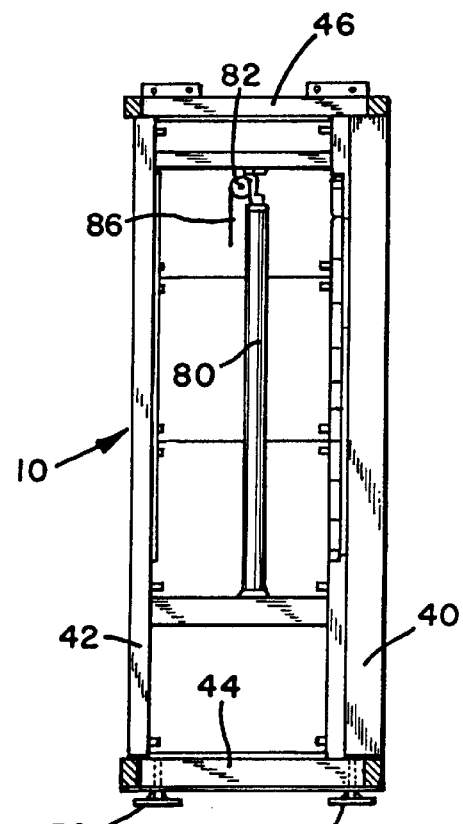
FIG. 6 is a vertical cross sectional view of the splitting station frame taken along the line 6—6 in FIG. 3.
Figure 5:
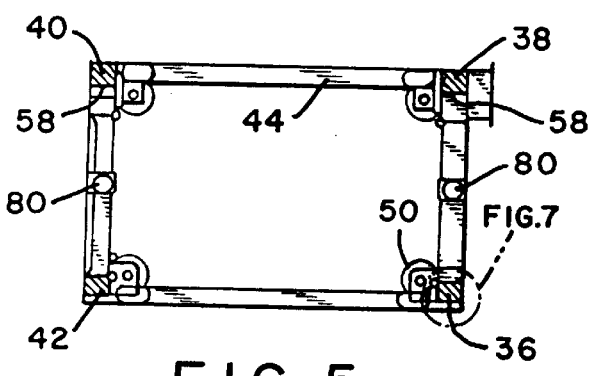
FIG. 5 is a horizontal cross sectional view of the splitting station frame taken along the line 5—5 in FIG. 4.
Figure 8:
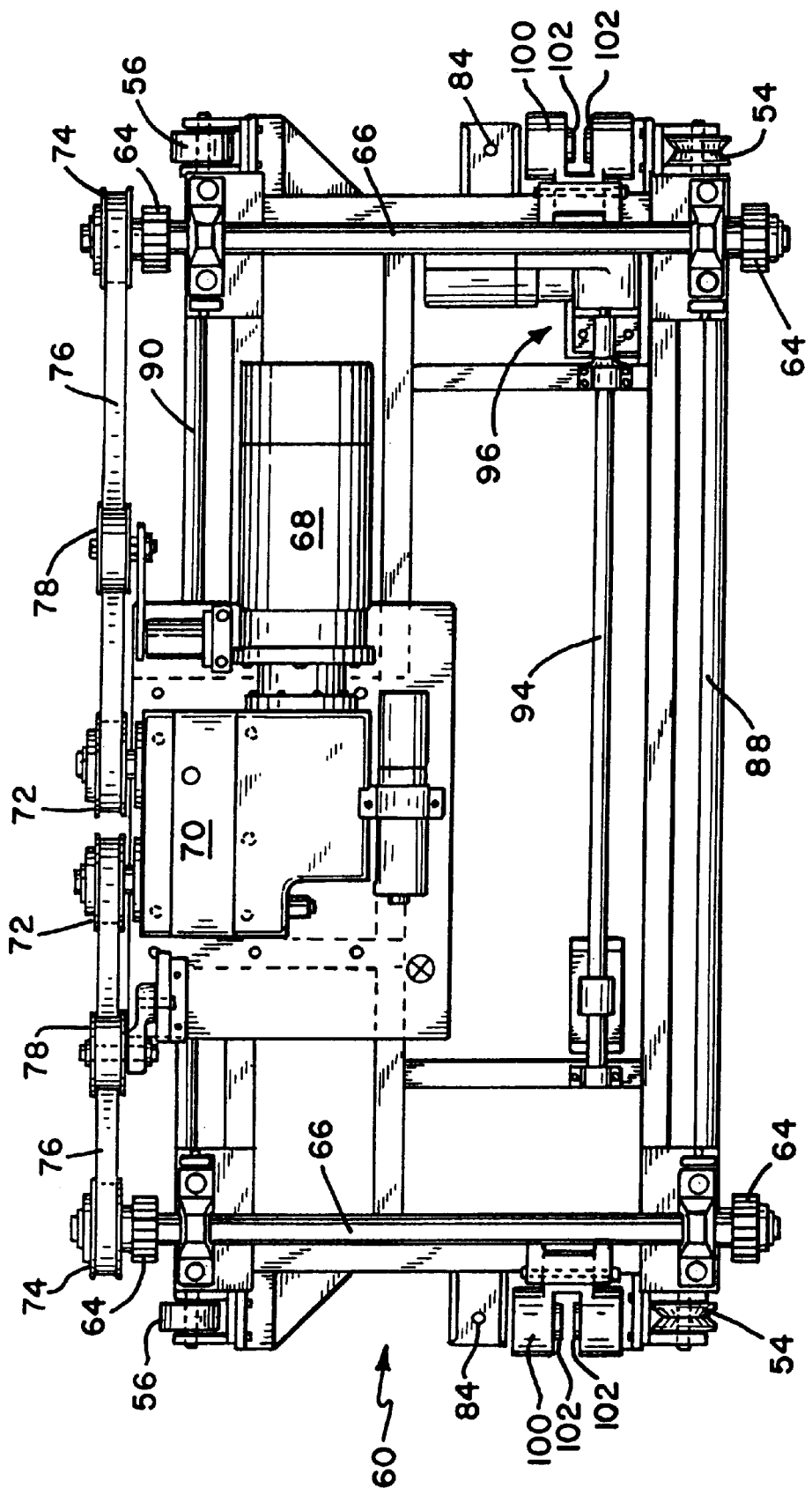
FIG. 8 is a top plan view of the vertical carriage that moves within the splitting station frame seen in FIGS. 3–7. The tracking carriage and horizontal carriage carried by the vertical carriage have been omitted for clarity.

Referring to FIGS. 8–10, the pinion gears 64 are mounted on shafts 66. The shafts ensure that the gears turn in pairs. The shafts are turned by motor 68 operating through gear mechanism 70. Gear mechanism 70 includes two output shafts that turn in opposite directions, and the output shafts have toothed pulleys 72 mounted on them which drive corresponding pulleys 74 on shafts 66 through toothed belts 76, The belts 76 are adjusted in tension with idler pulleys 78. Motor 68 turns the gears within gear mechanism 70, and the toothed belts cooperate with the rack and pinion gears to ensure that the vertical motion of the vertical carriage is smooth and extremely precise. Motor 68 acts as a computer controlled vertical driver so that the position and vertical speed of the vertical carriage can be continuously controlled. Preferably, a digital encoder attached to the vertical drive system described above is used to supply rotation information to a computerized digital motion control system based on a programmable logic controller. This provides closed loop motion control of the position of the vertical carriage.

Alternatively, other types of conventional computer controlled positioning systems may also be used with this invention. The motor may be a stepping motor or linear drivers that are pneumatically or hydraulically operated or other types of drivers may also be used with appropriate position sensors and control systems. The terms "computer" and "computerized" as used in the description of the control system herein generally refers to any motion control system, and includes various types of special purpose digital logic controllers and programmable devices for motion control, as well as more general purpose microprocessors and the like.

The splitting station is preferably designed so that the motor 68 is sufficiently powerful to lift the weight of the vertical carriage and all the carriages and other elements mounted thereon against the force of gravity. However, to reduce wear and increase speed and safety, it is preferable to counterbalance the weight of the vertical carriage. Counterbalancing is provided by two vertical cable cylinders 80 seen best in FIG. 6. The vertical cable cylinders 80 include a piston located inside the cylinder which is pressurized above the piston. The piston pulls downward on the cable 86 which passes out the top of the cable cylinder and over pulley 82, then down into attachment with the vertical carriage at point 84 (see FIG. 6).

The pressure inside the cable cylinder 80 can be adjusted to exactly counterbalance the weight of the vertical carriage 60 with a constant force so that the principal function of the vertical driver motor 68 is to quickly position the vertical carriage and not support its weight. Other types of counterbalancing systems are also suitable, including mass counterbalancing, but the use of the pneumatic cable cylinders reduces the total weight of the equipment as compared to conventional mass balancing which would require additional weights corresponding to the weight of the vertical carriage and its attached horizontal carriages (described below).

Referring now to FIG. 8, it can be seen that the vertical carriage 60 is provided with automatic brakes 100. This is a safety feature to prevent the vertical carriage from falling vertically downward in the event of a power failure. The brakes 100 are held open against powerful internal springs so long as the automatic saw is powered. In the event of power failure, the brake pads 102 are released to automatically close and grip a vertical brake rail that extends between brake pads.

The brake rail is supported vertically on the splitting station frame seen in FIGS. 3–7. Preferably, the brake rail has a T-shaped cross section, with the top of the T being fastened to the splitting station frame and the remainder of the T always projecting between the brake pads 102 as the vertical carriage moves vertically.

Referring to FIGS. 9 and 10, as well as FIG. 8, it can be seen that the vertical carriage 60 includes a pair of tracking rails 88, 90 located along the front and rear edges of the vertical carriage. The tracking rails 88, 90 are parallel to the carcass rail 14 and allow the saw and guide roller carriages that are carried on tracking carriage 92 (seen in FIGS. 11, 12 and 13) to move horizontally with the carcass as it is carried along the carcass rail 14.

The tracking carriage 92 seen in FIGS. 11, 12 and 13 hangs from the tracking rails 88, 90, below the vertical carriage. Roller bearings 95, 97 engage the tracking rails 88, 90 respectively and allow the tracking carriage to move left and right to follow the motion of the carcass as it moves along the carcass rail and then to be returned to the initial starting position to follow a subsequent carcass.

In the preferred design, the tracking rails 88, 90 are tubular and are formed of a non-corroding material. Such rails are commonly referred to as "Thomson rails". Rails of this type may also be used instead of the V-rails 52 described in connection with the vertical carriage, with corresponding roller bearings being used to replace the V-roller wheels 56. Other types of high precision linear guides with matching linear bearings may also be used.

The tracking rails 88, 90 are mounted to the vertical carriage with bolts 98 from their underside so that the upper surfaces and portions of the lower surface of the tracking rails, on either side of the mounting bolts 98, can be engaged by the corresponding roller bearings 95, 97 to prevent the tracking carriage 92 from lifting up off the surface of tracking rails 88, 90.

Figure 11:
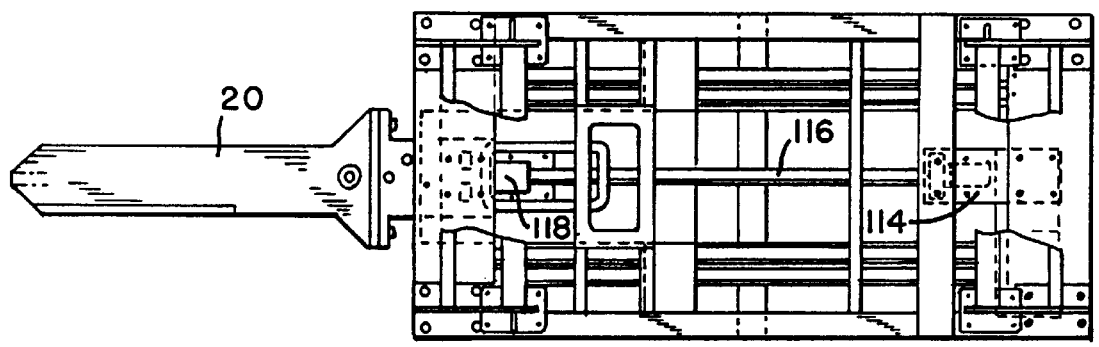
FIG. 11 is a top plan view of the tracking carriage and horizontal carriages carried by and suspended below the vertical carriage seen in FIGS. 8–10.
Figure 12:
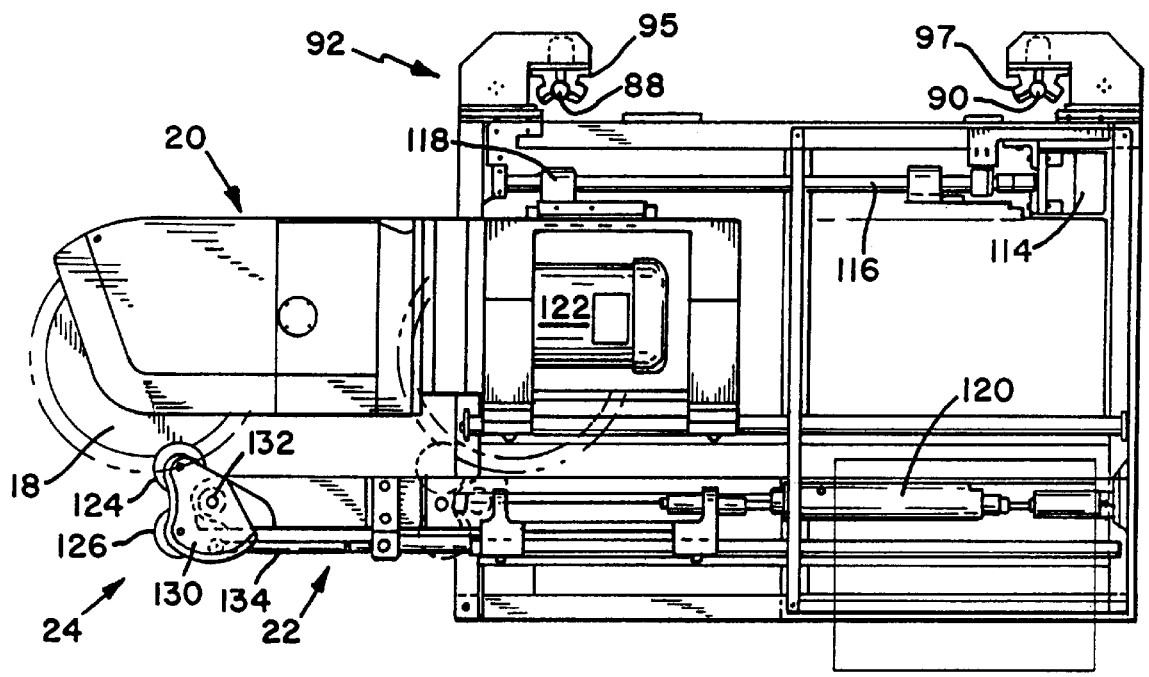
FIG. 12 is a side elevational view of the tracking carriage and horizontal carriages seen in FIG. 11.
Figure 13:
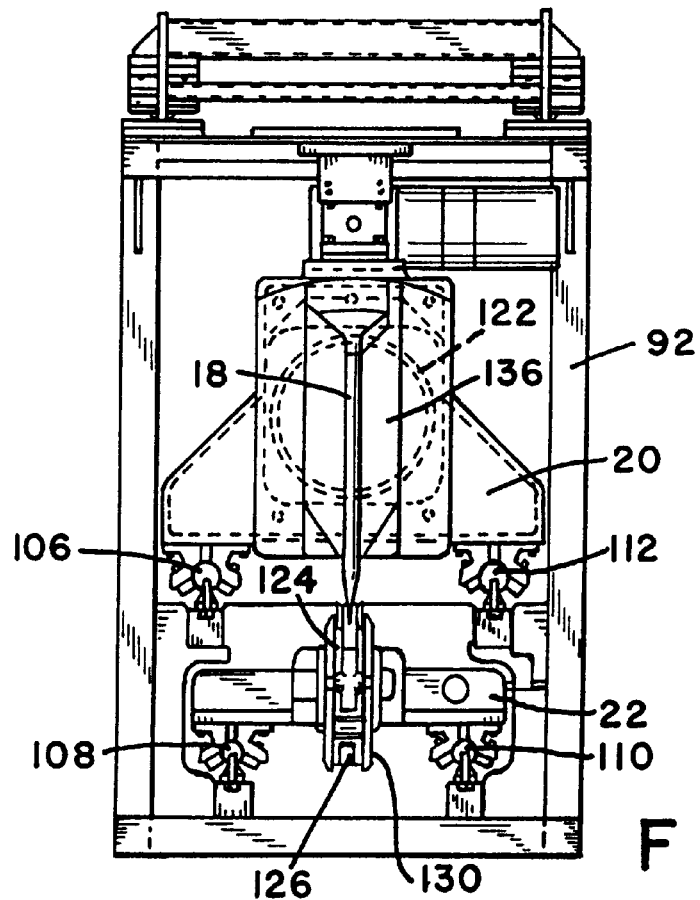
FIG. 13 is a front elevational view of the tracking carriage and horizontal carriages seen in FIG. 11.

Referring to FIGS. 11–13, the tracking carriage 92 and the two horizontal carriages, including the saw carriage 20 and the guide roller carriage 22 can be seen. The tracking carriage 92 is driven horizontally to follow the motion of the carcass by a rotating drive screw 94 (see FIG. 8) mounted on the vertical carriage 60. Drive screw 94 is rotated by the tracking driver 96 which comprises a motor that is also under computer motion control. This may be a stepping motor, a motor with an encoder for position information, or other linear driver suitable for accurate motion control applications.

Drive screw 94 engages a nut (not shown) on the tracking carriage. Rotating the drive screw 94 causes the nut and the tracking carriage to which it is attached to move left or right. This allows the tracking carriage to be horizontally driven at the desired speed to accurately follow the motion of the carcass along the carcass rail. Other types of horizontal drivers for moving the tracking carriage, including linear drivers that are pneumatic or hydraulic may also be used, providing that appropriate control schemes are implemented to maintain the desired accurate position and speed of the tracking carriage.

As can be seen best in FIG. 13, the tracking carriage 92 includes four tubular horizontal rails 106, 108, 110 and 112. The saw carriage 20 and guide roller carriage 22 ride on these rails in a manner similar to the manner in which the tracking carriage 92 rides on the tracking rails 88, 90, except that the saw carriage 20 and guide roller carriage 22 ride on top of the rails instead of being suspended below them.

Because rails 106–112 are perpendicular to rails 88, 90, the saw carriage 20 and the guide roller carriage 22 may be moved towards and away from the carcass in the previously described extension and retraction motions. The independent tracks and drive systems allow them to be independently moved. They are moved by corresponding drivers, including saw driver 114 which rotates drive screw 116 engaged by nut 118 (see FIG. 12). Driver 114 is also numerically controlled via the computerized motion control system so that the saw 18 may be extended and retracted at the desired speed and time to split the carcass either partially or completely.

The guide rollers are designed to provide a reference point for the motion of the saw when the guide roller carriage is fully extended with the guide rollers contacting the internal faces of the backbone in the carcass. Accordingly, the guide roller carriage is either extended fully into contact with the carcass (during cutting) or it is retracted fully (during reset). Pneumatically operated guide roller driver 120 provides the extension and retraction motion.

The extension force applied to the guide roller carriage 22 by driver 120 is greater than the extension force applied to the back roller carriage 26. This ensures that the guide roller carriage is always fully extended and that the back roller carriage is the carriage that moves in and out as necessary to accommodate variations in thickness of the carcass between the inner surface of the backbone and the back of the carcass.

This action ensures that the guide rollers hold the carcass with the backbone at a known point relative to the saw 18. The saw may then be moved relative to the extended guide rollers to obtain the correct extension position relative to the carcass backbone.

The saw 18 includes a rotary blade that is driven by saw motor 122. Although not shown in detail, the housing 136 that surrounds the saw 18 is provided with sanitizing water and/or steam orifices, and various cleaning nozzles and the like are positioned inside the splitting station 10 to clean the saw and guide roller when they are retracted. The cleaning solutions and operation of the spray nozzles to clean the saw are also operated by the digital control system of the automated splitting saw.

The guide roller assembly 24 is particularly important in accurately positioning the carcass and contributes to the improved performance of the saw in cutting the backbone precisely along the desired path. The guide roller assembly 24 includes a pair of guide rollers 124, 126 mounted on a pivoting bracket 130 that has two vertical rotating plates supporting axles on which the guide rollers turn.

Bracket 130 pivots on pivot point 132 and is biased with gas cylinder 134 so that the upper guide rollers 124 are forwards and contact the carcass first as the guide roller carriage is extended. Biasing may alternatively be accomplished with a spring, an air cylinder or other means. The force supplied by the guide roller driver 120 is sufficient to cause the bracket 130 to pivot against the force supplied by gas cylinder 134 until the lower guide rollers 126 also come into contact with the carcass backbone.

As can be seen in FIG. 1, the backbone of the carcass begins to curve substantially near the head of the carcass. In the preferred design, the pivoting action of the guide roller is sensed, and this information is provided to the computer control system to detect the point at which the saw begins to reach the head area. This information may be used to control the finishing stage of the cutting action, for example, by partially retracting the saw at this point, if desired.

Figure 16:
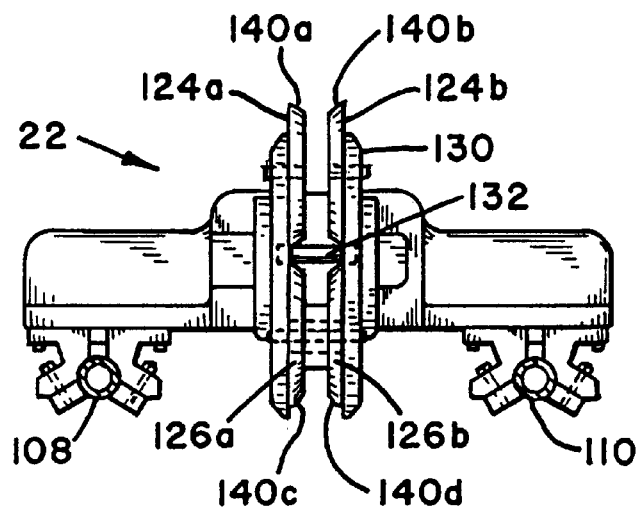
FIG. 16 is a front elevational view of the guide roller carriage seen in FIG. 15.

FIG. 14 shows the saw carriage 20 removed from the tracking carriage 92. FIGS. 15 and 16 show the guide roller carriage removed from the tracking carriage. As can be seen best in FIG. 16, the upper guide roller 124 includes two halves 124a and 124b that turn on separate axles. This allows the saw blade 18 and any protrusions from the backbone to extend into the space between the two halves 124a and 124b of the upper guide roller. The lower guide roller 126 also includes two halves 126a and 126b that form a similar gap between them, although a single axle is used.

This double roller design with a gap between the halves, coupled with the inwardly angled surfaces 140a, 140b, 140c and 140d on the four halves and the pivoting action of bracket 130, allows the guide rollers to center and accurately hold the backbone 32 relative to the saw 18. This centering action continues as the guide rollers move down the backbone during each cut The backbone 32 is carefully guided between the two halves 124a and 124b of the upper guide roller 124 and between the corresponding halves 126a and 126b of the lower guide roller 126. Because the guide roller carriage and the back roller carriage are extended prior to the extension of the saw carriage, the carcass is positioned before the saw begins to cut, and the saw arrives at the desired point to begin cutting exactly on the center line of the backbone 32.

Figure 17:
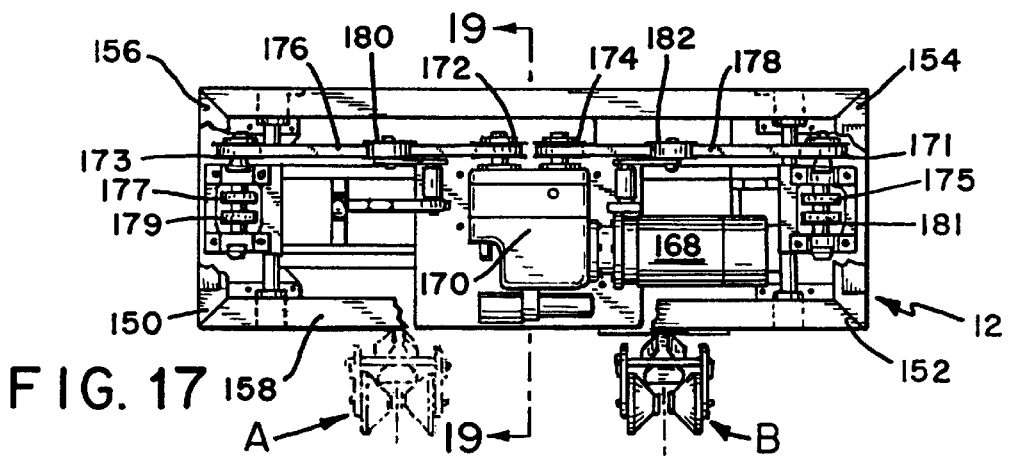
FIG. 17 is a top plan view of the back roller station seen in FIG. 1.
Figure 18:
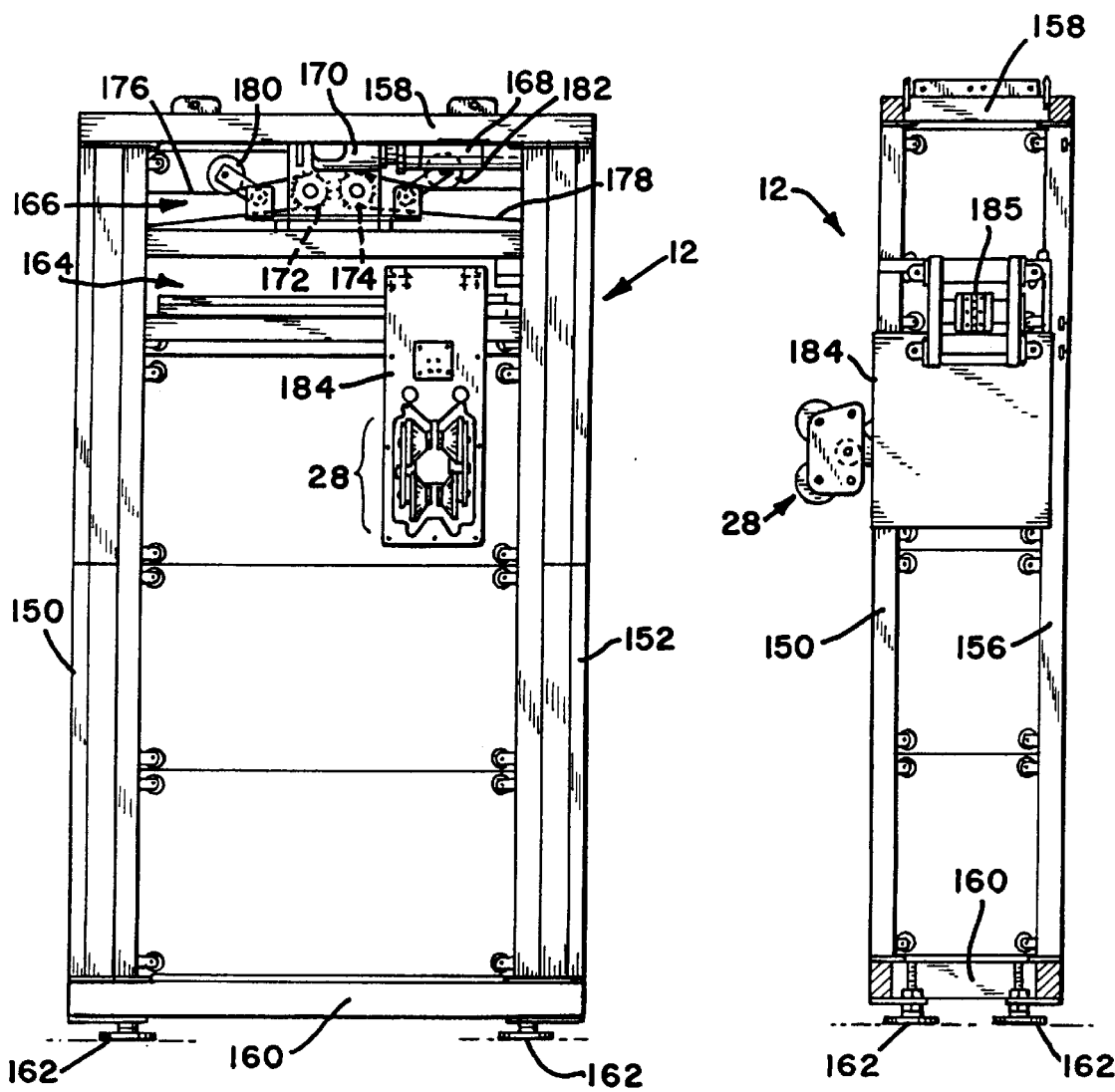
FIG. 18 is a front elevational view of the back roller station seen in FIG. 17.
Figure 19:
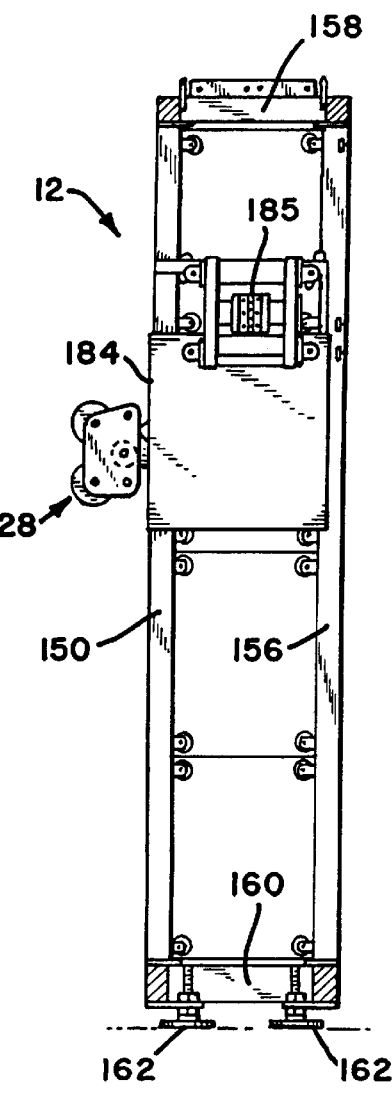
FIG. 19 is a cross sectional view of the back roller station taken along the line 19—19 in FIG. 17.

FIGS. 17–19 show the back roller station 12. The back roller station includes a frame comprising four vertical corner posts 150, 152, 154, 156 and upper and lower rectangular members 158, 160 that are essentially similar to the frame described for the splitting station. The lower rectangular frame 160 is mounted on feet 162 bolted to the floor to hold the back roller station securely in position. Feet 162 also permit leveling and vertical adjustment of the position of the back roller station 12 in the same manner as permitted by feet 50 on the splitting station frame.

The operation of the back roller station 12 includes many similarities to the operation of the splitting station 10. The vertical corner posts 150–156 are provided with V-rails and a second vertical carriage 164 moves vertically within the back roller station. One difference, however, is that in the splitting station the vertical carriage 60 carries its own driver mechanism for vertical motion whereas in the back roller station it is preferred for the drive mechanism 166 to be permanently mounted at the top of the splitting station frame.

The drive mechanism 166 includes a motor 168 driving a gear assembly 170 having two counter rotating outputs turning toothed pulleys 172, 174. Toothed belts 176, 178 pass under idler pulleys 180, 182, which are adjustable to provide the proper tension. The belts 176, 178 turn toothed pulleys 171, 173 which turn shafts having toothed pulleys 175, 177 mounted thereon. This portion of the back station drive mechanism is substantially identical to the mechanism described in connection with the splitting station, except that the shafts turn toothed pulleys 175, 177 instead of pinion gears.

The toothed pulleys 175, 177 drive vertical belts 179, 181 that extend between the upper toothed pulleys 175, 177 and lower toothed pulleys mounted near the bottom of the frame. The second vertical carriage 164 is clamped to one side of the vertical belts 179, 181 so that the drive mechanism 166 can move the vertical carriage 164 vertically.

The vertical carriage 164 in the back roller station includes a pair of tracks upon which is suspended the second tracking carriage 184. The second tracking carriage 184 moves horizontally to track the motion of the carcass in substantially the same manner described for the motion of the first tracking carriage in the splitting station. The tracking driver 185 for the tracking carriage 184 is computer controlled, as is the motor 168 that powers the vertical driver for the vertical carriage. These drivers and computer control allow the position of the back roller assembly 28 to be adjusted to accurately follow the motion of the saw.

The second tracking carriage 184 is structurally independent of the first tracking carriage, and the two tracking carriages are preferably driven independently by separate drivers.

As can be seen best in FIGS. 18, 20 and 22, the back roller assembly 28 includes four separate back rollers 186,188,190 and 192. These rollers define a gap between them at 194 (see FIG. 22) that corresponds to the plane of the saw blade 18. This gap allows the saw blade to penetrate completely through the carcass even while the back rollers are in contact with the back of the carcass.

Back rollers 186–192 are cone-shaped and are provided with angled inner surfaces 186a, 188a, 190a, and 192a. The large back rollers 186–192 are also provided with small inner back rollers 196, 198, 200 and 202 that cooperate with the larger outer rollers 186–192 to assist in maintaining alignment between the backbone of the carcass, which may be slightly elevated relative to the surface, and the back of the carcass on either side of the backbone.

As may be seen in FIG. 21, the back rollers are mounted on a pivoting bracket 206 that pivots on pivot 208 to follow the curvature of the carcass (as illustrated in FIG. 1). The bracket is biased to return to the upright position Illustrated in FIG. 1 when not in contact with the carcass. The back roller assembly 28 is carried on a back roller carriage 26 that moves from the extended position shown in solid lines in FIG. 21 to the retracted position shown in phantom in FIG. 21. Extension and retraction of the back roller carriage 26 is achieved with a linear driver applying a pressure to extend the back roller carriage 26 in a manner similar to the extension of the guide roller carriage except that that extension force is less than the extension force of the guide roller carriage.

This difference between the extension forces ensures that the guide roller carriage will remain fully extended, while the back roller carriage will partially retract, as necessary to accommodate the thickness of the carcass. The back roller carriage 26 rides on tracks 214 carried on the back roller tracking carriage and the back roller tracking carriage rides on tracks 216, 218 carried on the vertical carriage 164.

Because of the relatively tight tolerances between the saw blade, moved by the splitting station, and the back rollers, moved by the back roller station, the control mechanism for the independent motions of the back roller station and the splitting station must be carefully synchronized. The horizontal tracking motion during the cutting phase is accurately controlled so that the saw moves horizontally in exact synchronism with the back roller. Vertical motion may or may not be synchronized. Also, retraction of the saw will generally occur before the retraction of the back roller or of the guide rollers.

Although synchronous motion between the two stations is preferred, it should be noted that the motion of the two stations is entirely independent due to the independent drivers and controls. Where desired, the back rollers, guide rollers and saw may be moved independently. Synchronization is preferably achieved by using an encoder driven by the chain drive moving carcasses along the carcass rail. The encoder signals the motion control system as the carcass rail chain moves.

Although the present invention is described in a configuration in which the tracking carriage is mounted on the vertical carriage, and the horizontal carriages (saw and guide roller carriages) are mounted on the tracking carriage, the invention may also be constructed in other configurations. For example, the vertical carriage may be mounted on the tracking carriage.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. An automated saw for splitting a suspended carcass through the backbone as the carcass is continuously moved along a carcass rail, the automated saw comprising:
   a splitting station including:
      a fixed splitting station frame;
      a first tracking carriage movably mounted on the splitting station frame for motion parallel to the carcass rail; and
      a splitting saw carried on the first tracking carriage, the splitting saw being movable by the splitting station vertically and horizontally perpendicular to the carcass rail; and
   a back roller station including:
      a fixed back roller station frame;
      a second tracking carriage movably mounted on the back roller station frame for motion parallel to the carcass rail, the second tracking carriage being structurally independent of the first tracking carriage; and
      a back roller assembly carried on the second tracking carriage for contacting the back of the carcass, the back roller assembly being movable by the back roller station vertically and horizontally perpendicular to the carcass rail.

2. The automated saw of claim 1 further comprising:
   a first tracking driver for driving the first tracking carriage and the splitting saw at a speed corresponding to the motion of the carcass along the carcass rail; and
   a second tracking driver for driving the second tracking carriage and the back roller assembly at a speed corresponding to the motion of the first tracking carriage to maintain relative alignment of the back roller assembly and the splitting saw.

3. The automated saw of claim 2 further comprising:
   a first vertical carriage movably mounted on the splitting station frame for vertical motion, the first tracking carriage being movably mounted on the first vertical carriage for motion parallel to the carcass rail;
   a first vertical driver for driving the first vertical carriage vertically;
   a second vertical carriage movably mounted on the back roller station frame for vertical motion, the second tracking carriage being movably mounted on the second vertical carriage for motion parallel to the carcass rail; and
   a second vertical driver for driving the second vertical carriage vertically.

4. The automated saw of claim 3 further comprising an automated safety brake connected between the first vertical carriage and the splitting station frame.

5. The automated saw of claim 3 wherein the first vertical driver is mounted on the first vertical carriage.

6. The automated saw of claim 5 wherein the second vertical driver is mounted on the back roller station frame.

7. The automated saw of claim 3 wherein the first vertical driver includes a rack and pinion gear set, the rack being mounted on the splitting station frame.

8. The automated saw of claim 3 wherein the first vertical driver includes at least two rack and pinion gear sets, the racks being mounted vertically on opposite sides of the splitting station frame, and the pinion gears being driven by the first vertical driver in opposite rotational directions to vertically move the first vertical carriage.

9. The automated saw of claim 8 wherein the first vertical driver includes four rack and pinion gear sets, the four racks being mounted vertically at four corners of the splitting station frame.

10. The automated saw of claim 3 further comprising:
    a saw carriage movably mounted on the first tracking carriage for motion perpendicular to the carcass rail between a saw extended position and a saw retracted position, the splitting saw being mounted on the saw carriage;
    a saw motor mounted on the saw carriage for driving the splitting saw; and
    a saw carriage driver for driving the saw carriage between the saw extended position and the saw retracted position.

11. The automated saw of claim 10 further comprising:
    a guide roller carriage movably mounted on the first tracking carriage for motion perpendicular to the carcass rail between a guide roller extended position and a guide roller retracted position;
    a guide roller mounted on the guide roller carriage for contacting the interior of the carcass; and
    a guide roller carriage driver for driving the guide roller carriage between the guide roller extended position and the guide roller retracted position.

12. The automated saw of claim 11 wherein the guide roller includes two halves, the two halves of the guide roller contacting the carcass on opposite sides of the carcass backbone.

13. The automated saw of claim 12 wherein the two halves of the guide roller include angled surfaces.

14. The automated saw of claim 11 wherein the guide roller comprises first and second guide rollers mounted on a guide roller bracket, the guide roller bracket being pivotally mounted on the guide roller carriage.

15. The automated saw of claim 14 further including a guide roller biasing means for biasing the guide roller bracket such that the first guide roller contacts the carcass before the second guide roller.

16. The automated saw of claim 14 wherein the first and second guide rollers each include two halves with angled surfaces.

17. The automated saw of claim 11 wherein the saw carriage driver is computer controlled for retracting and extending the saw carriage independently of the retraction and extension motion of the guide roller carriage.

18. The automated saw of claim 11 further comprising:
 a back roller carriage movably mounted on the second tracking carriage for motion perpendicular to the carcass rail between a back roller extended position and a back roller retracted position; and
 a back roller carriage driver for driving the back roller carriage between the back roller extended position and the back roller retracted position, the back roller carriage driver having an extension force that is less than the extension force of the guide roller carriage driver.

19. The automated saw of claim 1 wherein the back roller assembly comprises at least two back rollers that are approximately conical over a portion thereof.

20. The automated saw of claim 1 wherein the back roller assembly comprises at least four back rollers mounted in a pivoting bracket, the bracket pivoting to allow the back rollers to continuously contact the carcass as the carcass is split.

21. The automated saw of claim 1 wherein the back roller assembly comprises a plurality of large back rollers, a portion of the large back rollers being substantially conical over a portion thereof, and a plurality of small back rollers.

22. An automated saw for splitting a suspended carcass through the backbone as the carcass is continuously moved along a defined path, the automated saw comprising:
 a splitting station including:
  a fixed splitting station frame;
  a first vertical carriage mounted for vertical motion;
  a first tracking carriage mounted for motion approximately parallel to the defined path of the carcass;
  a first horizontal carriage mounted for motion approximately perpendicular to the defined path of the carcass between extended and retracted positions;
  a guide roller carriage mounted for motion approximately perpendicular to the defined path of the carcass between extended and retracted positions, the guide roller carriage and the first horizontal carriage being movable relative to each other in the direction perpendicular to the defined path of the carcass;
  a plurality of station drivers for driving the first vertical carriage, the first tracking carriage and the first horizontal carriage;
  a splitting saw carried by the first vertical carriage, the first tracking carriage and the first horizontal carriage and movable by the plurality of splitting station drivers in three directions, including vertically, horizontally parallel to the defined path and horizontally perpendicular to the defined path of the carcass; and
  a guide roller carried by the first vertical carriage, the first tracking carriage and the guide roller carriage for motion in three directions, including vertically, horizontally parallel to the defined path and horizontally perpendicular to the defined path of the carcass; and a back roller station including:
  a fixed back roller station frame;
  a second vertical carriage mounted for vertical motion;
  a second tracking carriage mounted for motion approximately parallel to the defined path of the carcass, the first and second tracking carriages being independently drivable in synchronous motion to follow a carcass moving along the defined path;
  a back roller carriage mounted for motion approximately perpendicular to the defined path of the carcass between extended and retracted positions;
  a plurality of back roller station drivers for driving the second vertical carriage, the second tracking carriage and the back roller carriage; and
  a back roller for contacting the back of the carcass, the back roller being carried by the second vertical carriage, the second tracking carriage and the back roller carriage and movable by the plurality of back roller station drivers in three directions, including vertically, horizontally parallel to the defined path and horizontally perpendicular to the defined path of the carcass.

23. An automated saw for splitting a suspended carcass through the backbone as the carcass is continuously moved along a carcass rail, the automated saw comprising:
 a saw carriage having a splitting saw mounted thereon, the saw carriage being movable by the automated saw between extended and retracted positions;
 a guide roller carriage having at least one guide roller mounted thereon for contacting the interior of the carcass, the guide roller carriage being independently movable relative to the saw carriage between extended and retracted positions; and
 a back roller carriage having at least one back roller mounted thereon for contacting the back of the carcass, the back roller carriage being movable by the automated saw between extended and retracted positions
 the back roller carriage and the guide roller carriage being movable into positioning engagement with the carcass before the splitting saw begins to split the carcass.

24. A method of splitting a suspended carcass through the backbone as the carcass is continuously moved along a defined path, the method comprising: the steps of:
 extending a guide roller into contact with an inner surface of the carcass backbone, the guide roller being extended with a known extension force, and the backbone of the carcass being moved by the guide roller into a known reference position;
 extending a back roller into contact with a back surface of the carcass, the back roller being extended with a known extension force less than the known extension force of the guide roller;
 extending a saw into cutting engagement with the carcass after the guide roller and back roller contact the carcass;
 driving the saw vertically to split the carcass;
 driving the saw and the guide roller horizontally to follow the moving carcass; and
 independently driving the back roller horizontally in synchronism with the saw and the guide roller to follow the moving carcass.

* * * * *

UNITED STATES PATENT AND TRADEMARK OFFICE
CERTIFICATE OF CORRECTION

PATENT NO. : 6,126,536
DATED : October 3, 2000
INVENTOR(S) : Jean C. Kielwasser

It is certified that error appears in the above-identified patent and that said Letters Patent is hereby corrected as shown below:

In column 8, line 33, after "76" delete "," and substitute therefor -- . -- .

IN THE CLAIMS

In column 16, line 39, claim 23, after "positions" insert -- , -- .

In column 16, line 45, claim 24, after "comprising" delete ":".

Signed and Sealed this

Eighth Day of May, 2001

Attest:

NICHOLAS P. GODICI

Attesting Officer     Acting Director of the United States Patent and Trademark Office